June 2, 1953   T. G. HUNTER   2,640,326
COMBINATION BREAKER BUOY AND POWER GENERATING MEANS
Filed May 28, 1952                                    4 Sheets-Sheet 1
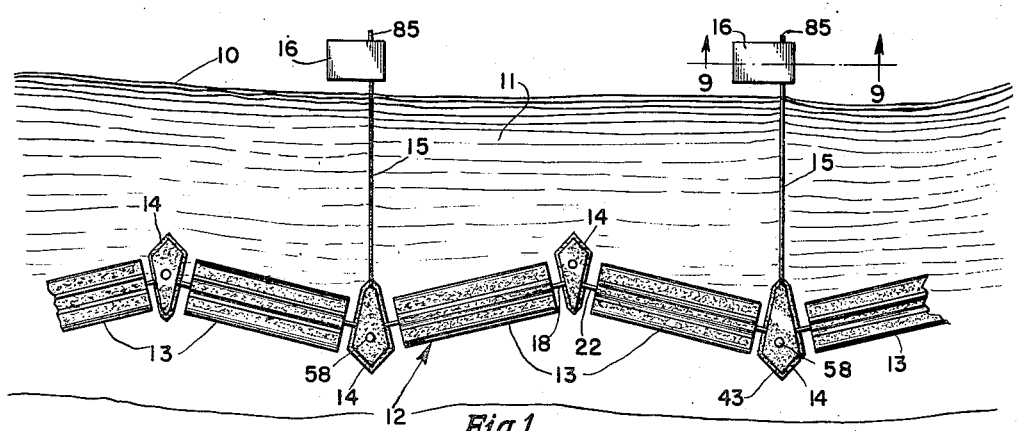
Fig. 1
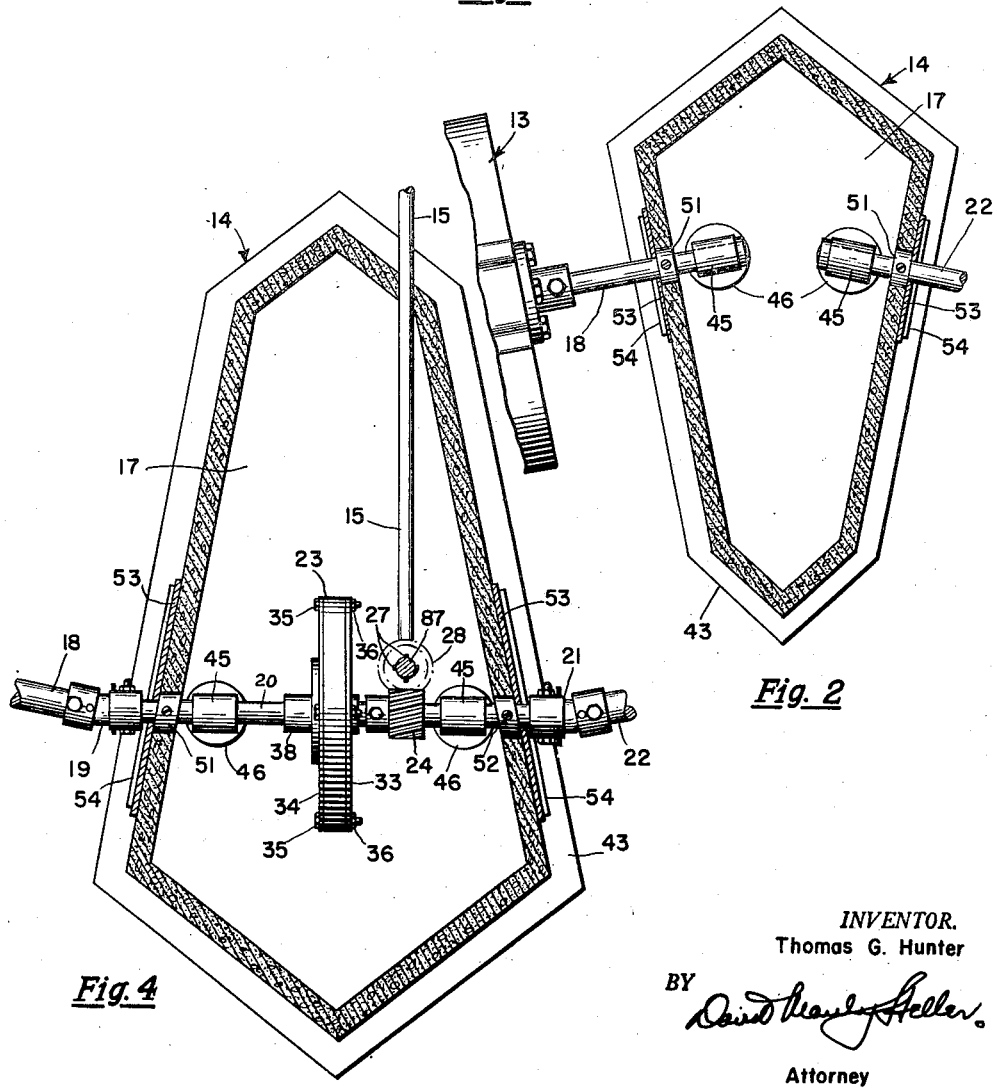
Fig. 2
Fig. 4
INVENTOR.
Thomas G. Hunter
BY
Attorney

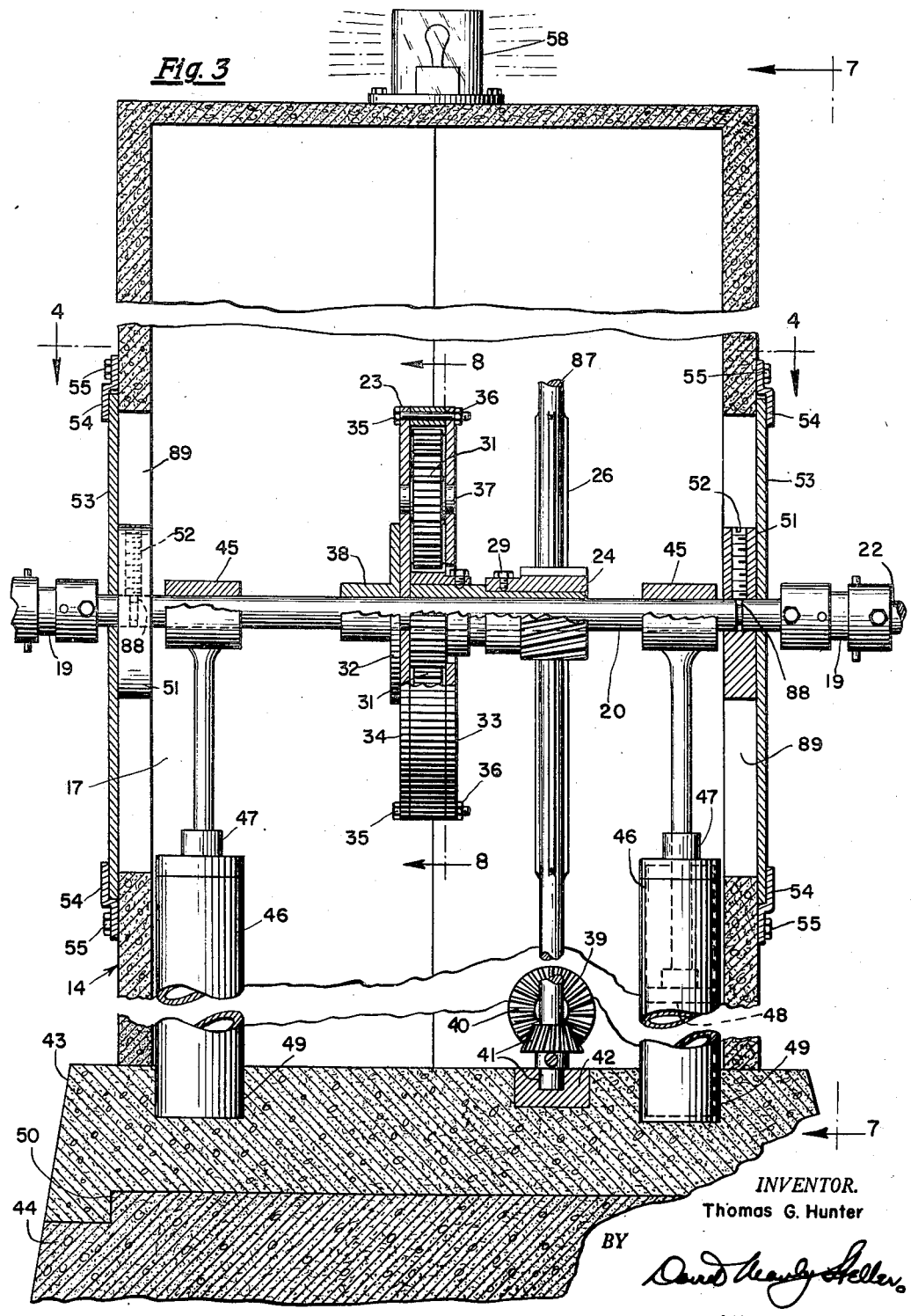

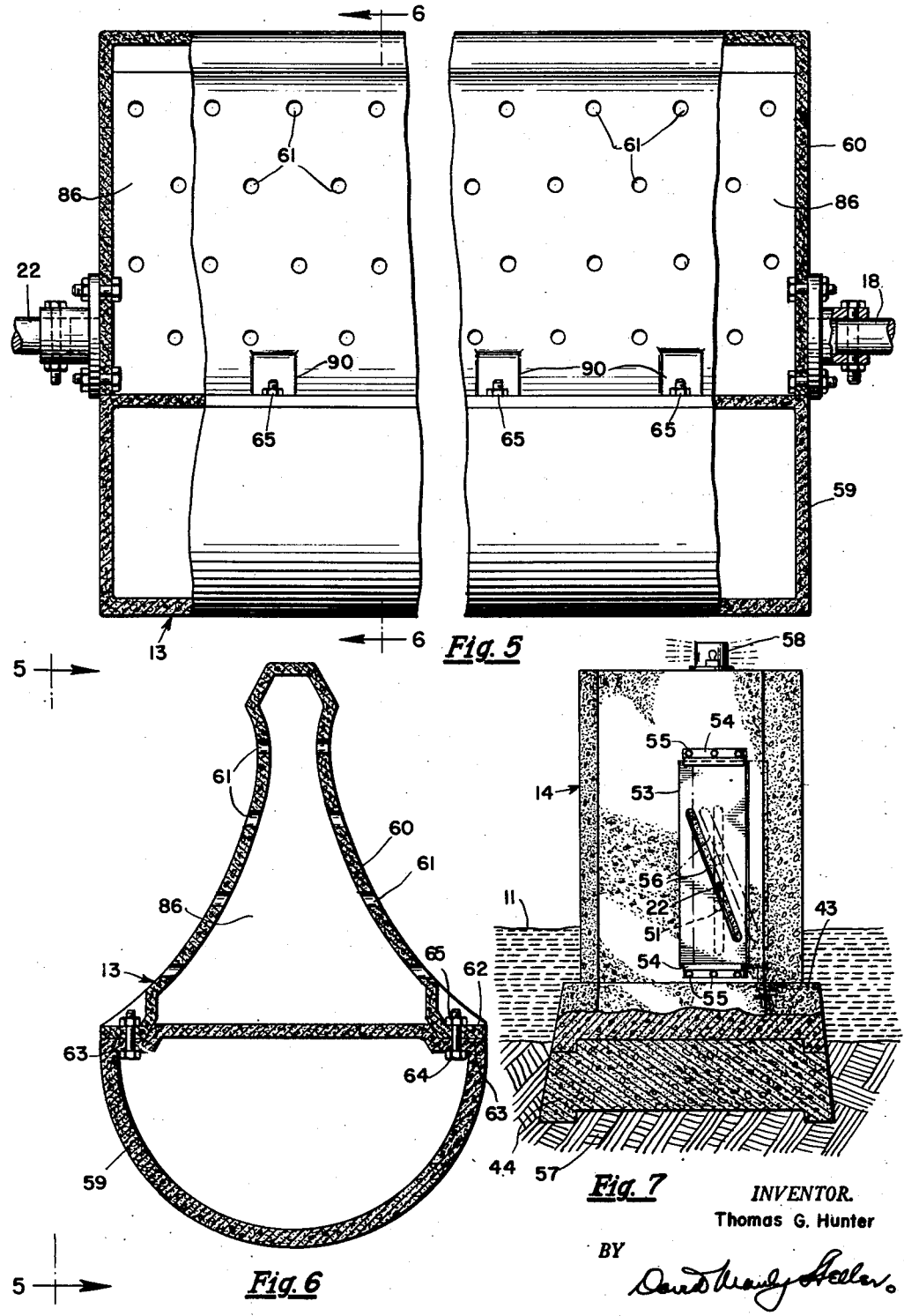

June 2, 1953 T. G. HUNTER 2,640,326
COMBINATION BREAKER BUOY AND POWER GENERATING MEANS
Filed May 28, 1952 4 Sheets-Sheet 4
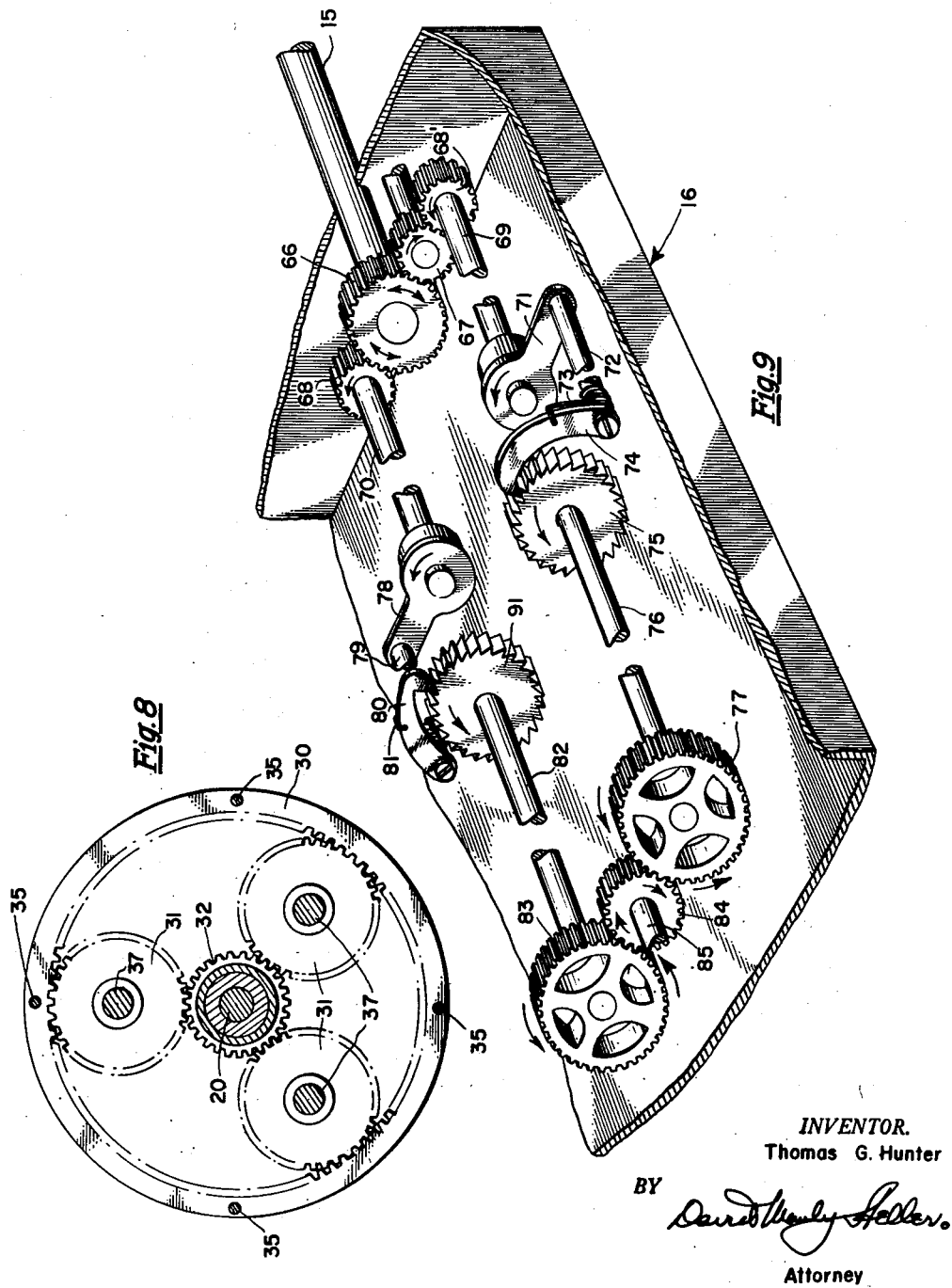
INVENTOR.
Thomas G. Hunter
BY
Attorney Patented June 2, 1953

2,640,326

UNITED STATES PATENT OFFICE 2,640,326

COMBINATION BREAKER BUOY AND POWER GENERATING MEANS

Thomas G. Hunter, Chicago, Ill.

Application May 28, 1952, Serial No. 290,444

18 Claims. (Cl. 61—20)

My invention relates to combination structure which embraces breaker buoy means and wave power translation means.

An important object of my invention is to provide a structure which may be mounted on pier means, positioned at regular intervals, either in parallel, or in zigzag, relationships to the shoreline of a river, lake or similar body of water, to prevent, on the one hand, shore erosion, and on the other hand, to translate the wave motions and forces developed by the waves into useful power by providing a suitable power take-off.

Another object of my invention is to provide a structure of the aforementioned character in which planetary gearing in concert with bevel and spiral gearing will impart power and rotation in a continuous direction to a power take-off shaft.

A still further object of my invention is to provide in a structure of the aforementioned character, floating buoy means equipped with dashpot cushioning means in order to cushion the impact caused by the buoyancy thereof when actuated by the water waves.

A still further object of my invention is to provide in breaker buoy means of the aforementioned character, bore means in the upper section thereof to permit water to circulate therethrough, and to permit the same to fluctuate compatibly with the wave motions which support it floatably.

A still further object of my invention is to provide in the aforementioned pier means slidable plate closure means provided with an oblique opening so as to form a seal to prevent water from entering the interior confines of the pier means.

A still further object of my invention is to provide static pier means which is interconnected by buoy means, the same being continuously connected through the agency of universal joint means.

Other objects and advantages inherent in my invention will be readily recognized by those familiar with the art when reference to the drawings is had, as well as to the ensuing description which amplifies the structural relationship of the parts depicted on the drawing; various figures designate the relationship of the structure, each figure being identified by like numerals representing like elemental structure, and in which:

Fig. 1 is a top view compositely of the structure comprising my invention located within certain distance from the shore of a natural body of water.

Fig. 2 is an enlarged horizontal sectional view of one of the pier means comprising my invention.

Fig. 3 is a vertical section through another of the said pier means which has mounted within the interior confines thereof transmission mechanism for translating the water waves to rotary power through continuous rotation in one direction of a power take-off. In order to impart continuous operation to the power take-off shaft, the action of the buoy means will necessitate that the reciprocatory motion or intermittent motion up and down of the buoy means impart continuous rotation to the power take-off shaft means.

Fig. 4 is a horizontal cross-sectional view taken, substantially on the lines 4—4 of Fig. 3.

Fig. 5 is a view looking in the direction of arrows 5—5 on Fig. 6 with the ends thereof broken away in section in order to more clearly illustrate the structural relationship of the two sections comprising the same.

Fig. 6 is a cross-sectional view taken, substantially, on the lines 6—6 of Fig. 5.

Fig. 7 is a view of the pier means as seen looking in the direction of arrows 7—7 on Fig. 3.

Fig. 8 is a sectional view taken, substantially, on the lines 8—8 of Fig. 3.

Fig. 9 is a sectional view taken, substantially, on the lines 9—9 of Fig. 1 and shown in perspective arrangement.

Referring to the various views, a body of water 11 is illustrated in Fig. 1 showing the shore line 10 which is to be protected from erosion by the constant washing of the waves thereagainst under varied tidal conditions.

My invention is, generally, designated 12 and consists of a series of buoys 13 intermediately disposed between piers 14 arranged in zigzag relationship. Some of the piers 14, as illustrated in Fig. 2, merely support the ends of the shaft of the buoys 13 whereas alternate piers as illustrated in Figs. 4 and 3 house transmission gearing so as to translate the intermittent and reciprocatory upward and downward movement of the buoys 13 to afford a constant rotation to the transmission shaft 15 and the power take-off 85 through the gearing contained in the transmission box 16 which will provide continuous rotation to the power take-off shaft 85 regardless of the intermittent reciprocatory movement of the shaft 15.

One of the pier structures 14 illustrated in

Fig. 2 has hollow confines or a compartment 17 in which the shafts 18 and 22 are supported on suitable dash-pot constructions similar to that illustrated in Figs. 3 and 4. The other or alternate pier means are provided with transmission equipment to motivate the shaft 15. The transmission equipment comprises spiral gearing 24 and 28, the spiral gearing 28 having splined guide slots to fit the splines 26 on the shaft 87.

The shaft 20 is provided with an undercut portion in which the screw 52, having a tip portion 88, is guided so as to permit rotation thereof and stabilize the key 51 which operates in the opening 89 slidably up and down. The water is prevented from entering the confines 17 of the piers by means of the plate structure designated 53 operating slidably in the guide brackets 54 held firmly by screws 55 to the body of the pier 14.

The shaft 20 is provided with universal joints 19 and 21 at each end so as to permit the buoys and the piers to be arranged in the formation illustrated in Fig. 1.

The plate 53 is equipped to slide as indicated by the dotted position in Fig. 7, and is provided with an oblique slot 56 so that the shaft running therethrough will be permitted to operate up and down within the slot 89 guided by the key 51 therein, at the same time preventing water from entering the confines 17 of the pier structure.

The pier 14 has a base 43 mounted on footing 44 and located by the cut-out portion 50. The footing 44 is embedded in the bed 57 of the body of water 11. The shaft 20 is secured to a pair of bearing portions 45 which are extended downwardly and through the stuffing gland 47 into the dash-pot structure 46, supporting at its other terminal portion the piston 48 which operates within the dash-pot structure 46 so as to cushion the downward movement of the weighty structure of the buoy when it operates floatably between adjacent piers 14. The dash-pot structure 46 is located in the pockets 49 in the base 43.

The transmission mechanism which translates the up and down motion of the buoy means through the shaft 20 consists, as hereinbefore mentioned, of spiral gearing 24 and 28 which, through the shaft 87 and through bevel gearing 39 and 40, the bevel gear 40 being supported in a bearing box 42 by the stub end 41 thereof so that the rotation from the movement of the shaft will be imparted to the gear 39 and alternately to the shaft 15.

The shaft 20 supports one spiral gear 24 firmly by means of the set screw 29, the other spiral gear 28 is free to work on the spline keyways 27 and the splines 26. The planetary gearing consists of an enclosure confining gears 31 mounted on shaft 37 in mesh with the central gear 32 mounted on shaft 20.

The plates 33 and 34 are held firmly in place by the bolts 35 and the nuts 36. Bushing 38 also serves to furnish proper support for the planetary gearing section 23.

The entire structure, thus, when it moves up and down, will impart intermittent rotation to the gearing 39 and the shaft 15 to be translated to continuous power and rotation through shaft 85; the illustration of Fig. 9 depicts the transmission and gearing necessary for that purpose. The buoys are also equipped with beacon means 58 for illumination at night to act as a warning to ships and planes requiring notice that this structure is to be avoided and not impacted.

It will also be noticed in Fig. 3 that the pier means 14 has a very strong and solid foundation so that the same furnishes an embedding arrangement for the dash-pot structure 46, for the bearing block 42, and is provided with an undercut portion 50 to fit the footing 44.

The entire structure possesses rigidity and will permit the buoys to operate floatably therebetween. The buoy structure, as illustrated in Figs. 5 and 6 consists of an upper, more or less prismatic section 60 having interior confines 86 and bores 61 to permit water to circulate therethrough so as to permit it to act compatibly with, and not militate against, the impact of the waves; the arcuate formation thereof as illustrated at 60 permits the rebound of the waves impacting the buoy structure and the deflection of the said wave impact away from the shore. The upper section 60 is secured to a lower semicylindrical section 59 provided with a seat 63; the upper portion being provided with a bevelled seating structure so that the same may be firmly secured by means of bolts 64 and nuts 65 at the concavities 90 or moving shoulders 62.

The shaft 15 is in turn connected to an intermittent, or reciprocatory moving, gear 66 which is in mesh with pinions 67 and 68′, and also pinion 68, being also connected to the shaft 70. The shafts 69 and 70 support arms 71 and 78 and the said arms or links 71 and 78 are supported pivots 72 and 79 so as to permit mounting on the said arms or links 72 and 79, the pawls 74 and 80, respectively, which are urged into meshing engagement by the springs 73 and 81, with the ratchets 75 and 91. It is the province of pinion 68′ to impart rotation to power take-off 85 in the same direction as pinion 68 regardless of the reciprocatory action of the driving gear 66.

It will be noticed that the tooth formation on the ratchets 75 and 91 is the same, but the pawls are mounted in reverse order so that when one grabs the other is free and vice-versa. The ratchets are mounted on shafts 76 and 82 which support at their other ends the gearing 77 and 83 in mesh with the intermediate pinion 84 mounted on the take-off or power supply shaft 85 emanating from the transmission box 16. Thus, when the waves strike the buoy structure 13, some of the waves will be returned by virtue of the arcuate formation 60 and the piers are made of a tapered construction so that the waves would not impart a great deal of force thereto, the pier splitting the waves striking it.

The floating of the buoys in an up and down direction will cause the gearing 24 and 28, and planetary gearing 23 to transmit its motion through the bevel gearing 39 and 40 to the shaft 15; the cushioning being afforded by the dash-pot structures 46 will furnish a smooth action; the plate structure 53, and by virtue of its oblique slotted arrangements 56, simultaneously preventing water from entering the pier structure 14.

Thus the shaft 15 will have imparted thereto an intermittent motion which will rotate the pinions 68 and 68′ in opposite directions and which will in turn cause the gearing 82 and 83 to rotate in the same direction so that the intermediate pinion 84 will go in one direction as distinguished from the driving gear 66 which oscillates or reciprocates intermittently as indicated by the arrows shown thereon. The ratchet structures 75 and 91 and the associated pawl structure 74 and 80 will provide this uniform continuous rotation to the shaft 85 emanating from the transmission box 16.

Thus, in the use of my invention, a distinct advantage will be gained, firstly to prevent shore erosion at the shoreline 10, and secondly, a translation of the wave power generated intermittently to provide a continuously operating power take-off shaft so that prime movers, pumps, dynamos or other machinery may be operated therefrom providing a saving and economy of operation and installation of the entire structure.

While I have illustrated and described what I now regard as the preferred form of construction, it is to be understood that I expressly reserve the right to make all such changes or modifications as may fairly fall within the scope of the appended claims.

Having thus disclosed and revealed my invention, what I claim as new and desire to secure by Letters Patent is:

1. Combination breaker buoy means for the prevention of shoreline erosion of a natural body of water and wave power translation means, comprising a multiplicity of stationary pier means mounted on the bed of the said body of water and in substantially parallel relationship to the said shoreline and arranged in staggered formation, primary shaft means secured internally the said pier means, secondary shaft means, universal joint means securing the said primary shaft means to the said secondary shaft means, breaker buoy means secured to the said secondary shaft means, and transmission means mounted within the said pier means and provided with transmission shaft means extending beyond the confines of the said pier means.

2. Combination breaker buoy means for the prevention of shoreline erosion of a natural body of water and wave power translation means, comprising a multiplicity of stationary pier means mounted on the bed of the said body of water and in substantially parallel relationship to the said shoreline and arranged in staggered formation, primary shaft means secured internally the said pier means, secondary shaft means, universal joint means securing the said primary shaft means to the said secondary shaft means, breaker buoy means secured to the said secondary shaft means, transmission means mounted within the said pier means and provided with transmission shaft means extending beyond the confines of the said pier means, and plate seal means mounted slidably and in transverse relationship on the walls of the said pier means and provided with oblique slotted means mounted to operate slidably on the said primary shaft means.

3. Combination breaker buoy means for the prevention of shoreline erosion of a natural body of water and wave power translation means, comprising a multiplicity of stationary pier means mounted on the bed of the said body of water and in substantially parallel relationship to the said shoreline and arranged in staggered formation, primary shaft means secured internally the said pier means, secondary shaft means, universal joint means securing the said primary shaft means to the said secondary shaft means, breaker buoy means secured to the said secondary shaft means, transmission means mounted within the said pier means and provided with transmission shaft means extending beyond the the confines of the said pier means, and transmission box means located on the said shoreline for resolving intermittent motion of the said secondary shaft means imparting reciprocatory motivation to the said transmission shaft means to effective and continuous rotation in one direction, the said transmission box means being provided with power take-off means extending therebeyond.

4. Combination breaker buoy means for the prevention of shoreline erosion of a natural body of water and wave power translation means, comprising a multiplicity of stationary pier means mounted on the bed of the said body of water and in substantially parallel relationship to the said shoreline and arranged in staggered formation, primary shaft means secured internally the said pier means, secondary shaft means, universal joint means securing the said primary shaft means to the said secondary shaft means, breaker buoy means secured to the said secondary shaft means, transmission means mounted within the said pier means and provided with transmission shaft means extending beyond the confines of the said pier means, plate seal means mounted slidably and in transverse relationship on the walls of the said pier means and provided with oblique slotted means mounted to operate slidably on the said primary shaft means, and transmission box means located on the said shoreline for resolving intermittent motion of the said secondary shaft means imparting reciprocatory motivations to the said transmission shaft means to effective and continuous rotation in one direction, the said transmission box means being provided with power take-off means extending therebeyond.

5. Combination breaker buoy means for the prevention of shoreline erosion of a natural body of water and wave power translation means, comprising a multiplicity of stationary pier means mounted on the bed of the said body of water and in substantially parallel relationship to the said shoreline and arranged in staggered formation, primary shaft means secured internally the said pier means, secondary shaft means, universal joint means securing the said primary shaft means to the said secondary shaft means, breaker buoy means secured to the said secondary shaft means, transmission means mounted within the said pier means and provided with transmission shaft means extending beyond the confines of the said pier means, plate seal means mounted slidably and in transverse relationship on the walls of the said pier means and provided with oblique slotted means mounted to operate slidably on the said primary shaft means, vertical slot means on the walls of the said pier means concealed by the said plate seal means, and key means slidably fitted to the said vertical slot means and rotatably operable on the said primary shaft means to prevent liquid from entering the interior confines of the said pier means.

6. Combination breaker buoy means for the prevention of shoreline erosion of a natural body of water and wave power translation means, comprising a multiplicity of stationary pier means mounted on the bed of the said body of water and in substantially parallel relationship to the said shoreline and arranged in staggered formation, primary shaft means secured internally the said pier means, secondary shaft means, universal joint means securing the said primary shaft means to the said secondary shaft means, breaker buoy means secured to the said secondary shaft means, transmission means mounted within the said pier means and provided with transmission shaft means extending beyond the confines of the said pier means, plate seal means mounted slidably and in transverse relationship on the walls of the said pier means and provided with oblique slotted means mounted to operate slidably on the said primary shaft means, transmission box means located on the said shoreline for resolving intermittent motion of the said secondary shaft means imparting reciprocatory motivations to the said transmission shaft means to effective and continuous rotation in one direction, the said transmission box means being provided with power take-off means extending therebeyond, vertical slot means on the walls of the said pier means concealed by the said plate seal means, and key means slidably fitted to the said vertical slotted means and rotatably operable on the said primary shaft means to prevent liquid from entering the interior confines of the said pier means.

7. Combination breaker buoy means for the prevention of shoreline erosion of a natural body of water and wave power translation means, comprising a multiplicity of stationary pier means mounted on the bed of the said body of water and in substantially parallel relationship to the said shoreline and arranged in staggered formation, primary shaft means secured internally the said pier means, secondary shaft means, universal joint means securing the said primary shaft means to the said secondary shaft means, breaker buoy means secured to the said secondary shaft means, transmission means mounted within the said pier means and provided with transmission shaft means extending beyond the confines of the said pier means, transmission box means located on the said shoreline for resolving intermittent motion of the said secondary shaft means imparting reciprocatory motivations to the said transmission shaft means to effective and continuous rotation in one direction, the said transmission box means being provided with power take-off means extending therebeyond, and operative machine means connected to the said power take-off.

8. Combination breaker buoy means for the prevention of shoreline erosion of a natural body of water and wave power translation means, comprising a multiplicity of stationary pier means mounted on the bed of the said body of water and in substantially parallel relationship to the said shoreline and arranged in staggered formation, primary shaft means secured internally the said pier means, secondary shaft means, universal joint means securing the said primary shaft means to the said secondary shaft means, breaker buoy means secured to the said secondary shaft means, transmission means mounted within the said pier means and provided with transmission shaft means extending beyond the confines of the said pier means, plate seal means mounted slidably and in transverse relationship on the walls of the said pier means and provided with oblique slotted means mounted to operate slidably on the said primary shaft means, transmission box means located on the said shoreline for resolving intermittent motion of the said secondary shaft means imparting reciprocatory motivations to the said transmission shaft means to effective and continuous rotation in one direction, the said transmission box means being provided with power take-off means extending therebeyond, and operative machine means connected to the said power take-off.

9. Combination breaker buoy means for the prevention of shoreline erosion of a natural body of water and wave power translation means, comprising a multiplicity of stationary pier means mounted on the bed of the said body of water and in substantially parallel relationship to the said shoreline and arranged in staggered formation, primary shaft means secured internally the said pier means, secondary shaft means, universal joint means securing the said primary shaft means to the said secondary shaft means, breaker buoy means secured to the said secondary shaft means, transmission means mounted within the said pier means and provided with transmission shaft means extending beyond the confines of the said pier means, plate seal means mounted slidably and in transverse relationship on the walls of the said pier means and provided with oblique slotted means mounted to operate slidably on the said primary shaft means, vertical slot means on the walls of the said pier means concealed by the said plate seal means, key means slidably fitted to the said vertical slotted means and rotatably operable on the said primary shaft means to prevent liquid from entering the interior confines of the said pier means, and operative machine means connected to the said power take-off.

10. Combination breaker buoy means for the prevention of shoreline erosion of a natural body of water and wave power translation means, comprising a multiplicity of stationary pier means mounted on the bed of the said body of water and in substantially parallel relationship to the said shoreline and arranged in staggered formation, primary shaft means secured internally the said pier means, secondary shaft means, universal joint means securing the said primary shaft means to the said secondary shaft means, breaker buoy means secured to the said secondary shaft means, transmission means mounted within the said pier means and provided with transmission shaft means extending beyond the confines of the said pier means, plate seal means mounted slidably and in transverse relationship on the walls of the said pier means and provided with oblique slotted means mounted to operate slidably on the said primary shaft means, transmission box means located on the said shoreline for resolving intermittent motion of the said secondary shaft means imparting reciprocatory motivations to the said transmission shaft means to effective and continuous rotation in one direction, the said transmission box means being provided with power take-off means extending therebeyond, vertical slot means on the walls of the said pier means concealed by the said plate seal means, key means slidably fitted to the said vertical slotted means and rotatably operable on the said primary shaft means to prevent liquid from entering the interior confines of the said pier means, and operative machine means connected to the said power take-off.

11. Combination breaker buoy means for the prevention of shoreline erosion of a natural body of water and wave power translation means, comprising a multiplicity of stationary pier means mounted on the bed of the said body of water and in substantially parallel relationship to the said shoreline and arranged in staggered formation, primary shaft means secured internally the said pier means, secondary shaft means, universal joint means securing the said primary shaft means to the said secondary shaft means, breaker buoy means secured to the said secondary shaft means, transmission means mounted within the said pier means and provided with transmission shaft means extending beyond the confines of the said pier means, transmission box means located on the said shoreline for resolving intermittent motion of the said secondary shaft means imparting reciprocatory motivations to the said transmission shaft means to effective and continuous rotation in one direction, the said transmission box means being provided with power take-off means extending therebeyond, and operative machine means connected to the said power take-off, the said breaker buoy means including two sections, a prismatic section having arcuate surfaces to deflect waves therefrom, provided further with bores to permit water to enter to afford compatible buoyant operation to the said breaker buoy.

12. Combination breaker buoy means for the prevention of shoreline erosion of a natural body of water and wave power translation means, comprising a multiplicity of stationary pier means mounted on the bed of the said body of water and in substantially parallel relationship to the said shoreline and arranged in staggered formation, primary shaft means secured internally the said pier means, secondary shaft means, universal joint means securing the said primary shaft means to the said secondary shaft means, breaker buoy means secured to the said secondary shaft means, transmission means mounted within the said pier means and provided with transmission shaft means extending beyond the confines of the said pier means, plate seal means mounted slidably and in transverse relationship on the walls of the said pier means and provided with oblique slotted means mounted to operate slidably on the said primary shaft means, transmission box means located on the said shoreline for resolving intermittent motion of the said secondary shaft means imparting reciprocatory motivations to the said transmission shaft means to effective and continuous rotation in one direction, the said transmission box means being provided with power take-off means extending therebeyond, and operative machine means connected to the said power take-off, the said breaker buoy means including two sections, a prismatic section having arcuate surfaces to deflect waves therefrom, provided further with bores to permit water to enter to afford compatible buoyant operation to the said breaker buoy.

13. Combination breaker buoy means for the prevention of shoreline erosion of a natural body of water and wave power translation means, comprising a multiplicity of stationary pier means mounted on the bed of the said body of water and in substantially parallel relationship to the said shoreline and arranged in staggered formation, primary shaft means secured internally the said pier means, secondary shaft means, universal joint means securing the said primary shaft means to the said secondary shaft means, breaker buoy means secured to the said secondary shaft means, transmission means mounted within the said pier means and provided with transmission shaft means extending beyond the confines of the said pier means, plate seal means mounted slidably and in transverse relationship on the walls of the said pier means and provided with oblique slotted means mounted to operate slidably on the said primary shaft means, vertical slot means on the walls of the said pier means concealed by the said plate seal means, key means slidably fitted to the said vertical slotted means and rotatably operable on the said primary shaft means to prevent liquid from entering the interior confines of the said pier means, and operative machine means connected to the said power take-off, the said breaker buoy means including two sections, a prismatic section having arcuate surfaces to deflect waves therefrom, provided further with bores to permit water to enter to afford compatible buoyant operation to the said breaker buoy.

14. Combination breaker buoy means for the prevention of shoreline erosion of a natural body of water and wave power translation means, comprising a multiplicity of stationary pier means mounted on the bed of the said body of water and in substantially parallel relationship to the said shoreline and arranged in staggered formation, primary shaft means secured internally the said pier means, secondary shaft means, universal joint means securing the said primary shaft means to the said secondary shaft means, breaker buoy means secured to the said secondary shaft means, transmission means mounted within the said pier means and provided with transmission shaft means extending beyond the confines of the said pier means, plate seal means mounted slidably and in transverse relationship on the walls of the said pier means and provided with oblique slotted means mounted to operate slidably on the said primary shaft means, transmission box means located on the said shoreline for resolving intermittent motion of the said secondary shaft means imparting reciprocatory motivations to the said transmission shaft means to effective and continuous rotation in one direction, the said transmission box means being provided with power take-off means extending therebeyond, vertical slot means on the walls of the said pier means concealed by the said plate seal means, key means slidably fitted to the said vertical slotted means and rotatably operable on the said primary shaft means to prevent liquid from entering the interior confines of the said pier means, and operative machine means connected to the said power take-off, the said breaker buoy means including two sections, a prismatic section having arcuate surfaces to deflect waves therefrom, provided further with bores to permit water to enter to afford compatible buoyant operation to the said breaker buoy.

15. Combination breaker buoy means for the prevention of shoreline erosion of a natural body of water and wave power translation means, comprising a multiplicity of stationary pier means mounted on the bed of the said body of water and in substantially parallel relationship to the said shoreline and arranged in staggered formation, primary shaft means secured internally the said pier means, secondary shaft means, universal joint means securing the said primary shaft means to the said secondary shaft means, breaker buoy means secured to the said secondary shaft means, transmission means mounted within the said pier means and provided with transmission shaft means extending beyond the confines of the said pier means, transmission box means located on the said shoreline for resolving intermittent motion of the said secondary shaft means imparting reciprocatory motivations to the said transmission shaft means to effective and continuous rotation in one direction, the said transmission box means being provided with power take-off means extending therebeyond, and operative machine means connected to the said power take-off, the said breaker buoy means including two sections, a prismatic section having arcuate surfaces to deflect waves therefrom, provided further with bores to permit water to enter to afford compatible buoyant operation to the said breaker buoy, and dash-pot means connected to the said primary shaft means to function in concert with the said bores to ease the buoyant action of the said breaker buoy means.

16. Combination breaker buoy means for the prevention of shoreline erosion of a natural body of water and wave power translation means, comprising a multiplicity of stationary pier means mounted on the bed of the said body of water and in substantially parallel relationship to the said shoreline and arranged in staggered formation, primary shaft means secured internally the said pier means, secondary shaft means, universal joint means securing the said primary shaft means to the said secondary shaft means, breaker buoy means secured to the said secondary shaft means, transmission means mounted within the said pier means and provided with transmission shaft means extending beyond the confines of the said pier means, plate seal means mounted slidably and in transverse relationship on the walls of the said pier means and provided with oblique slotted means mounted to operate slidably on the said primary shaft means, transmission box means located on the said shoreline for resolving intermittent motion of the said secondary shaft means imparting reciprocatory motivations to the said transmission shaft means to effective and continuous rotation in one direction, the said transmission box means being provided with power take-off means extending therebeyond, operative machine means connected to the said power take-off, the said breaker buoy means including two sections, a prismatic section having arcuate surfaces to deflect waves therefrom, provided further with bores to permit water to enter to afford compatible buoyant operation to the said breaker buoy, and dash-pot means connected to the said primary shaft means to function in concert with the said bores to ease the buoyant action of the said breaker buoy means.

17. Combination breaker buoy means for the prevention of shoreline erosion of a natural body of water and wave power translation means, comprising a multiplicity of stationary pier means mounted on the bed of the said body of water and in substantially parallel relationship to the said shoreline and arranged in staggered formation, primary shaft means secured internally the said pier means, secondary shaft means, universal joint means securing the said primary shaft means to the said secondary shaft means, breaker buoy means secured to the said secondary shaft means, and transmission means mounted within the said pier means and provided with transmission shaft means extending beyond the confines of the said pier means, plate seal means mounted slidably and in transverse relationship on the walls of the said pier means and provided with oblique slotted means mounted to operate slidably on the said primary shaft means, vertical slot means on the walls of the said pier means concealed by the said plate seal means, key means slidably fitted to the said vertical slotted means and rotatably operable on the said primary shaft means to prevent liquid from entering the interior confines of the said pier means, operative machine means connected to the said power take-off, the said breaker buoy means including two sections, a prismatic section having arcuate surfaces to deflect waves therefrom, provided further with bores to permit water to enter to afford compatible buoyant operation to the said breaker buoy, and dash-pot means connected to the said primary shaft means to function in concert with the said bores to ease the buoyant action of the said breaker buoy means.

18. Combination breaker buoy means for the prevention of shoreline erosion of a natural body of water and wave power translation means, comprising a multiplicity of stationary pier means mounted on the bed of the said body of water and in substantially parallel relationship to the said shoreline and arranged in staggered formation, primary shaft means secured internally the said pier means, secondary shaft means, universal joint means securing the said primary shaft means to the said secondary shaft means, breaker buoy means secured to the said secondary shaft means, transmission means mounted within the said pier means and provided with transmission shaft means extending beyond the confines of the said pier means, plate seal means mounted slidably and in transverse relationship on the walls of the said pier means and provided with oblique slotted means mounted to operate slidably on the said primary shaft means, transmission box means located on the said shoreline for resolving intermittent motion of the said secondary shaft means imparting reciprocatory motivations to the said transmission shaft means to effective and continuous rotation in one direction, the said transmission box means being provided with power take-off means extending therebeyond, vertical slot means on the walls of the said pier means concealed by the said plate seal means, key means slidably fitted to the said vertical slotted means and rotatably operable on the said primary shaft means to prevent liquid from entering the interior confines of the said pier means, operative machine means connected to the said power take-off, the said breaker buoy means including two sections, a prismatic section having arcuate surfaces to deflect waves therefrom, provided further with bores to permit water to enter to afford compatible buoyant operation to the said breaker buoy, and dash-pot means connected to the said primary shaft means to function in concert with the said bores to ease the buoyant action of the said breaker buoy means.

THOMAS G. HUNTER.

References Cited in the file of this patent

UNITED STATES PATENTS

| Number | Name | Date |
|--------|------|------|
| 870,706 | Woodard | Nov. 12, 1907 |

FOREIGN PATENTS

| Number | Country | Date |
|--------|---------|------|
| 487,512 | Germany | of 1929 |